United States Patent [19]

Kojima et al.

[11] Patent Number: 5,088,361

[45] Date of Patent: Feb. 18, 1992

[54] MACHINING CONTROL APPARATUS IN A MACHINE TOOL

[75] Inventors: Hiroshi Kojima, Aichi; Keikichi Sakata, Hiroshima; Seigo Watanabe, Gifu; Yukio Mitsukuchi, Aichi, all of Japan

[73] Assignee: Yamazaki Mazak Kabushiki Kaisha, Aichi, Japan

[21] Appl. No.: 701,631

[22] Filed: May 15, 1991

Related U.S. Application Data

[63] Continuation of Ser. No. 310,831, Feb. 8, 1989, abandoned.

[30] Foreign Application Priority Data

Feb. 9, 1988 [JP] Japan .................................. 63-28488

[51] Int. Cl.⁵ .............................................. B23B 13/04
[52] U.S. Cl. ...................................... 82/127; 29/27 R; 29/563; 82/118; 82/124; 364/474.11
[58] Field of Search ................. 29/27 R, 36, 563, 564, 29/27 C; 82/1.11, 118, 124–127, 129; 364/474.11, 474.12

[56] References Cited

U.S. PATENT DOCUMENTS

| | | | |
|---|---|---|---|
| 2,473,306 | 6/1949 | Ichieiber | 82/129 |
| 2,611,290 | 9/1952 | Bullard, III . | |
| 3,990,133 | 11/1976 | Schalles et al. . | |
| 4,008,634 | 2/1977 | Flisch . | |
| 4,151,765 | 5/1979 | Sevastakis . | |
| 4,404,727 | 9/1983 | Zankl . | |
| 4,443,937 | 4/1984 | Dominici et al. . | |
| 4,457,193 | 7/1984 | Matthey | 82/124 |
| 4,589,311 | 5/1986 | Link et al. . | |
| 4,612,832 | 9/1986 | Ushigoe et al. . | |
| 4,631,684 | 12/1986 | Akasofu et al. | 364/474.11 X |
| 4,674,163 | 6/1987 | Nugier . | |
| 4,719,676 | 1/1988 | Sansone | 82/124 |
| 4,763,549 | 8/1988 | Hata et al. . | |
| 4,949,444 | 8/1990 | Kojima et al. | 82/129 X |

FOREIGN PATENT DOCUMENTS

| | | | |
|---|---|---|---|
| 258955 | 8/1988 | Fed. Rep. of Germany . | |
| 51-14186 | 5/1976 | Japan . | |
| 52-24393 | 2/1977 | Japan . | |
| 56-139802 | 10/1981 | Japan . | |
| 57-48402 | 3/1982 | Japan . | |
| 58-28402 | 2/1983 | Japan . | |
| 58-56701 | 4/1983 | Japan . | |
| 58-186501 | 10/1983 | Japan . | |
| 59-129601 | 7/1984 | Japan . | |
| 59-176701 | 10/1984 | Japan . | |
| 60-177801 | 9/1985 | Japan . | |
| 60-232802 | 11/1985 | Japan . | |
| 61-152301 | 7/1986 | Japan . | |
| 62-102933 | 5/1987 | Japan . | |
| 62-130101 | 6/1987 | Japan . | |
| 62-152603 | 7/1987 | Japan . | |
| 62-297001 | 12/1987 | Japan . | |
| 272404 | 11/1988 | Japan | 82/124 |
| 2802 | 1/1989 | Japan | 82/127 |
| 16301 | 1/1989 | Japan | 82/124 |
| 2103529 | 2/1983 | United Kingdom . | |
| 2159450 | 12/1985 | United Kingdom . | |
| 2198677 | 6/1988 | United Kingdom . | |

Primary Examiner—Steven C. Bishop
Attorney, Agent, or Firm—Wenderoth, Lind & Ponack

[57] ABSTRACT

A machine tool has first and second spindles provided so as to face each other. The first and the second spindles are synchronously rotated without stopping their rotation. A machined workpiece, after a first machining routine, in a state of rotation is directly delivered from the first spindle to the second spindle, and a second routine of machining is immediately performed.

4 Claims, 5 Drawing Sheets

MACHINING CONTROL APPARATUS IN A MACHINE TOOL

This application is a continuation of now abandoned application Ser. No. 07/310,831 filed on Feb. 8, 1989 abandoned.

BACKGROUND OF THE INVENTION

This invention relates to a machining control method in a machine tool capable of performing a first routine of machining toward a workpiece at one spindle side and performing a second routine of machining in such a manner that a workpiece is delivered to the other spindle side while both spindles are synchronously rotated after the machining in a machine tool having the first and the second spindles facing toward each other.

In a case where first and second routines of machining are usually performed on a workpiece on a machine tool having two opposed spindles, such as a lathe, a workpiece is installed on one spindle. In this state, the first routine of machining is performed on the workpiece, and the machined workpiece, after the first routine, is delivered to the other spindle for performance of the second routine of machining. In a conventional method, when a workpiece is delivered, the rotation of the spindle holding the machined workpiece after the first routine is temporarily stopped. In this state, the workpiece after the first routine is detached form the spindle by means of a handling robot or the like. Furthermore, the workpiece is transferred to the other spindle for attachment to the spindle.

To stop the rotation of a spindle whenever a workpiece is delivered is so inconvenient that it takes many hours to deliver a workpiece, since the machined workpiece after the first routine cannot be detached by means of a robot or the like until the spindle stops completely. And in order to perform the second routine of machining after the workpiece detached from the spindle is attached to the other spindle, it is necessary that the rotation number of the other spindle is increased up to a predetermined rotation number necessary for performing machining on a workpiece from a stopped state. Therefore, such inconvenience is present that it takes a long time to perform the second routine of machining.

In consideration of the above-described circumstances, the object of this invention is to provide a machining control apparatus and method in a machine tool capable of performing the first routine of machining by holding a workpiece with one spindle between the opposed spindles, and performing the second routine of machining in such a manner that the workpiece is delivered to the other spindle without stopping the rotation of the spindle after the first routine of machining.

SUMMARY OF THE INVENTION

This invention is comprised as follows. That is, in a machining control method in a machine tool having the rotatable and drivable first and second spindles facing to each other capable of performing the first routine of machining by holding a workpiece by the first spindle and performing the second routine of machining by delivering the machined workpiece after the first routine to the second spindle, in case where the machined workpiece after the first routine is delivered from the first spindle to the second spindle, a control is done as follows. The first and the second spindles are synchronously rotated at the same rotation number. In this state, the first and the second spindles are relatively approached. The machined workpiece after the first routine, which is rotating by the first spindle, is held by the second spindle, and the holding relation between the workpiece and the first spindle is released while maintaining the workpiece rotating.

The present invention is comprised as follows. That is, in a machining control method in a machine tool having rotatable and drivable first and second spindles facing each other capable of performing a first routine of machining by holding a workpiece by the first spindle and performing a second routine of machining by delivering the machined workpiece after the first routine to the second spindle, in case where the machined workpiece after the first routine is delivered from the first spindle to the second spindle, a control is done as follows. The first and the second spindles are synchronously rotated at the same rotation number. In this state, the first and the second spindles are relatively approached. Then the machined workpiece after the first routine, which is rotating with the first spindle, is held by the second spindle and the holding relation between the workpiece and the first spindle is released. Thereafter, the second spindle is relatively separated from the first spindle while the first and the second spindles are rotating to pull the raw portion of the workpiece out from the first spindle. After the raw portion of the workpiece is pulled out, the rotating workpiece is held by the first and the second spindles. In this state, the workpiece, including the machined portion after the first routine, is separated from the raw portion of the workpiece. A second routine of machining is performed on the workpiece held by the second spindle.

According to the present invention, the second routine of machining can be immediately performed in such a manner that the first and the second spindles are synchronously rotated without stopping their rotation and the machined workpiece after the first routine, which is rotating, is delivered from the first spindle to the second spindle. Therefore, it is possible that machining time toward a workpiece is shortened.

DESCRIPTION OF THE PREFERRED EMBODIMENT

The preferred embodiment of the present invention will be described hereinafter according to the drawings.

Figure 1:
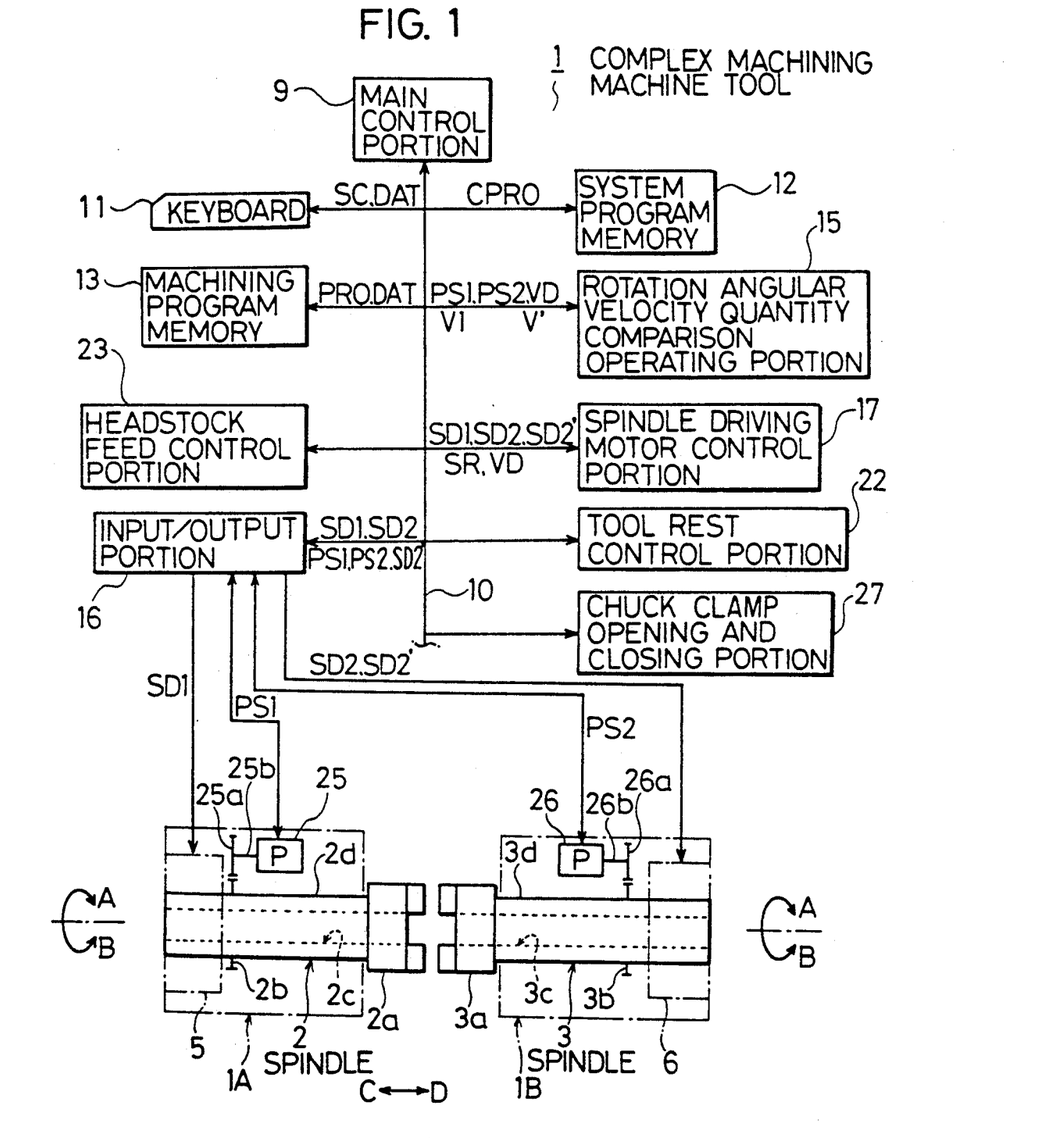
FIG. 1 is a view showing a portion of a complex machining machine tool to which an embodiment of a machining control method in a machine tool according to this invention is applied.

A complex machining machine tool 1 has headstocks 1A and 1B facing toward each other, the headstocks being movably and drivably provided in the Z axis direction, that is, in the directions as shown by the arrows C and D, by themselves, as shown in FIG. 1. Spindles 2 and 3 are provided with the headstocks 1A and 1B, face toward each other, and are each free to rotate in the directions as shown by the arrows A and B. Spindle driving motors 5 and 6 are respectively provided with the spindles 2 and 3, connecting with the spindles 2 and 3 directly. Chucks 2a and 3a are installed on the spindles 2 and 3, respectively facing toward each other. A through hole 2c is provided in the spindle 2 and the chuck 2a, penetrating the spindle 2 and the chuck 2a in the directions as shown by the arrows C and D (the Z axis direction), and a through hole 3c is provided in the spindle 3 and the chuck 3a, penetrating the spindle 3 and the chuck 3a in the directions as shown by the arrows C and D. Gears 2b and 3b are installed on outer peripheral surfaces 2d and 3d of the spindles 2 and 3, respectively.

Pulsecoders 25 and 26 are provided with the headstocks 1A and 1B, as shown in FIG. 1, respectively. Axial shafts 25b and 26b are rotatably provided with the pulsecoders 25 and 26, respectively. Gears 25a and 26a are installed on the axial shafts 25b and 26b, respectively, and the gears 25a and 26a mesh with the gears 2b and 3b, respectively.

Figure 6:
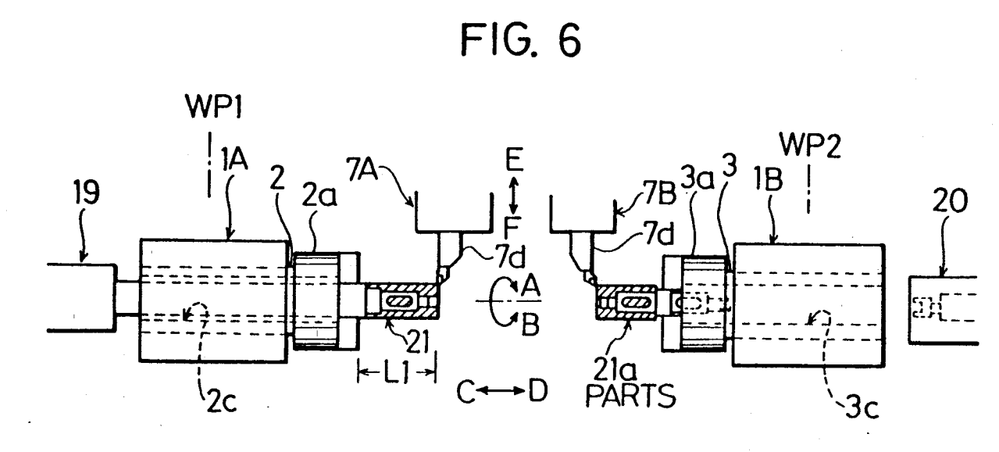

Two turret type tool rests 7A and 7B are movably and drivably provided with the complex machining machine tool 1, movable in the directions as shown by the arrows C and D (the Z axis direction) in FIG. 6 and in the directions as shown by the arrows E and F (the X axis direction) perpendicular to the directions as shown by the arrows C and D. A number of tools 7d are installed on the tool rests 7A and 7B, respectively. A barfeeder 19 is provided to the left of the spindle 2 in FIG. 6 in order to supply the spindle 2 with a bar-shaped workpiece 21. A workpiece pulling unit 20 is provided to the right of the spindle 3 in FIG. 6 in order to detach machined parts 21a, after the second machining routine, from the spindle 3.

The complex machining machine tool 1 has a main control portion 9, as shown in FIG. 1. A keyboard 11, a system program memory 12, a machining program memory 13, a rotation angular velocity quantity comparison operating portion 15, an input/output portion 16, a spindle driving motor control portion 17, a tool rest control portion 22, a headstock feed control portion 23, a chuck clamp opening and closing portion 27 and the like are connected with the main control portion 9 through a bus line 10. The spindle driving motors and 6 and the pulsecoders 25 and 26 as described before are connected with the input/output portion 16.

With the above-described constitution of the complex machining machine tool 1, a worker inputs machining data DAT necessary for machining through the keyboard 11 as shown in FIG. 1 in order to perform machining toward a workpiece by means of the machine tool 1. Then, the main control portion 9 outputs the machining data DAT to the machining program memory 13. The machining program memory 13 stores the machining data DAT as a part of the machining program PRO corresponding to a workpiece to be machined. Thereafter, a worker outputs a machining start command SC through the keyboard 11. Then, the main control portion 9 as shown in FIG. 1 reads out the machining PRO from the machining program memory 13 and executes the read-out machining program PRO.

Figure 2:
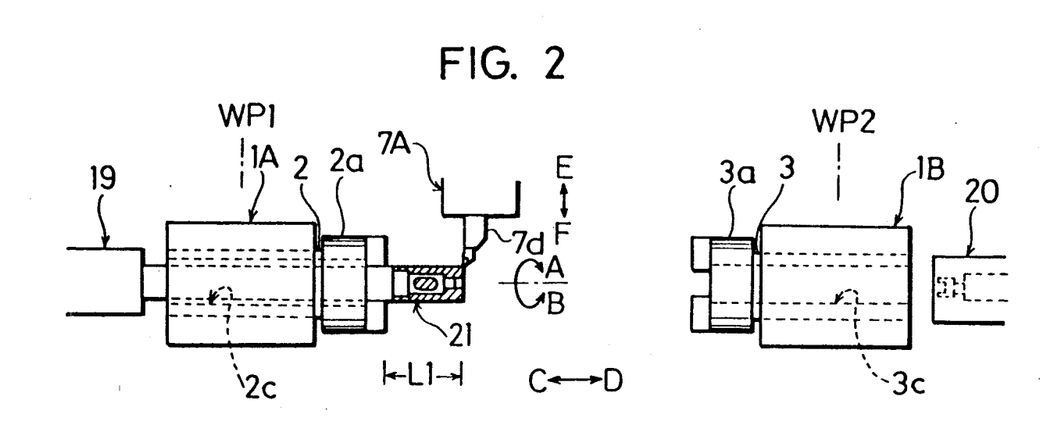
FIGS. 2 through 7 are views showing a process of machining a workpiece by means of the complex machining machine tool as shown in FIG. 1.

That is, the main control portion 9 as shown in FIG. 1 commands the barfeeder 19 as shown in FIG. 2 to supply the spindle 2 with the bar-shaped workpiece 21 through a barfeeder control portion (not shown) on a basis of the machining program PRO. Then the barfeeder 19 moves the bar-shaped workpiece 21 a predetermined distance in the direction as shown by the arrow D through the through hole 2c and sets the workpiece with its end portion protruding from the chuck 2a a predetermined length L1 in the direction as shown by the arrow D.

Thereafter, the main control portion 9 as shown in FIG. 1 commands the spindle driving motor control portion 17 to rotate the spindle driving motor 5 at a predetermined rotation number. Then the spindle driving motor control portion 17 outputs a predetermined driving control signal SD1 to the spindle driving motor 5 through the input/output portion 16. The spindle driving motor 5, on the basis of the signal, drives the spindle 2 in accordance with the signal SD1 and rotates the spindle 2 together with the bar-shaped workpiece 21 as shown in FIG. 2 at a predetermined rotation number in the direction as shown by the arrow A.

Thereafter, the main control portion 9, as shown in FIG. 1, drives the tool rest control portion 22 to position a tool 7d to be used for machining from the tools 7d installed in the tool rest 7A as shown in FIG. 2 at a position facing toward the bar-shaped workpiece 21. Moreover, the main control portion moves and drives the tool rest 7A together with the tool 7d in the directions as shown by the arrows E and F and in the directions as shown by the arrows C and D to the bar-shaped workpiece 21 to perform the first routine of machining, comprising a predetermined turning machining, milling machining and the like toward the bar-shaped workpiece 21. After the machining finishes, the tool rest 7A is moved and retracted in the direction as shown by the arrow E, and the spindle 2 is rotated at a rotation number V1 to be used where the bar-shaped workpiece 21 is cut off at the next workpiece delivery.

Figure 8:
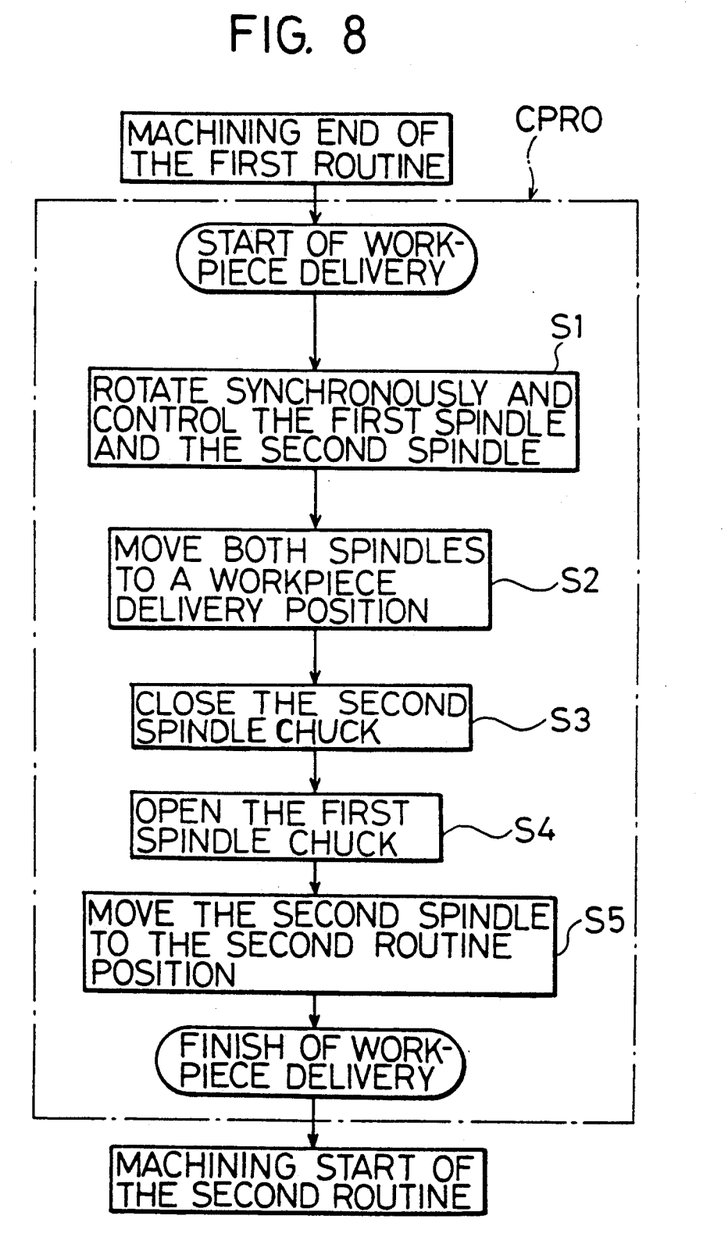
FIG. 8 is a flowchart for a workpiece delivery program.

In this way, when the first routine of machining finishes, the main control portion 9 as shown in FIG. 1 reads out a workpiece delivery program CPRO from the system program memory 12 in order to perform workpiece delivery and executes the program CPRO. That is, the main control portion 9 outputs a synchronous rotation command SR to the spindle driving motor control portion 17 as shown in FIG. 1 so that the spindle 3 can be synchronously rotated with the spindle 2 rotating at the rotation number V1 at the step S1 of the workpiece delivery program CPRO as shown in FIG. 8. Then, the spindle driving motor control portion 17 outputs a predetermined driving control signal SD2 to the spindle driving motor 6 through the input/output portion 16. The spindle driving motor 6, on the basis of the signal, rotates the spindle 3 together with the chuck 3a in the same direction as the rotation of the spindle 2 (that is, in the direction as shown by the arrow A) at the rotation number V', corresponding with the rotation number of the spindle 2 (that is, the rotation number V1 when the bar-shaped workpiece 21 is cut off by workpiece delivery).

The rotation of the spindle 2 is transmitted to the axial shaft 25b of the pulsecoder 25 as shown in 1 through the gears 2b and 25a, and the axial shaft 25b rotates at an angular velocity proportional to the rotation number V1 of the spindle 2. The pulsecoder 25 then outputs a pulse signal PS1 in accordance with the rotation number V1 of the spindle 2 to the input/output portion 16. And, the rotation of the spindle 3 is transmitted to the axial shaft 26b of the pulsecoder 26 through the gears 3b and 26a and the axial shaft 26b rotates at an angular velocity proportional to the rotation number V' of the spindle 3. The pulsecoder 26 then outputs a pulse signal PS2 in accordance with the rotation number V' of the spindle 3 to the input/output portion 16.

The pulse signals PS1 and PS2 inputted in the input/output portion 16 are outputted to the rotation angular velocity quantity comparison operating portion 15. The rotation angular velocity quantity comparison operating portion 15 obtains the rotation numbers V1 and V' of the spindles 2 and 3 on the basis of the pulse signals PS1 and PS2 and obtains a difference VD(=V1−V') between the rotation number V1 and V'. The rotation angular velocity quantity comparison operating portion 15 then outputs the obtained difference VD to the spindle driving motor control portion 17. The spindle driving motor control portion 17 revises the driving control signal SD2 to SD2' in accordance with the difference VD so that the rotation number V1 and V' of the spindles 2 and 3 can correspond with each other (that is, V1=V'). The revised driving control signal SD2' is outputted to the spindle driving motor 6 through the input/output portion 16.

The spindle driving motor 6 rotates and drives the spindle 3 in accordance with the driving control signal SD2' so that the rotation number V' can be equal to the rotation number V1 of the spindle 2. Therefore, the spindles 2 and 3 synchronously rotate in the direction as shown by the arrow A at the same rotation number V1 during a workpiece delivery action. Thereafter, the main control portion 9 as shown in FIG. 1 commands the chuck clamp opening and closing portion 27 to open the clamp of the chuck 3a in order to hold the bar-shaped workpiece 21 with the chuck 3a. Then the chuck clamp opening and closing portion 27 opens the clamp of the chuck 3a through the input/output portion 16.

Figure 3:
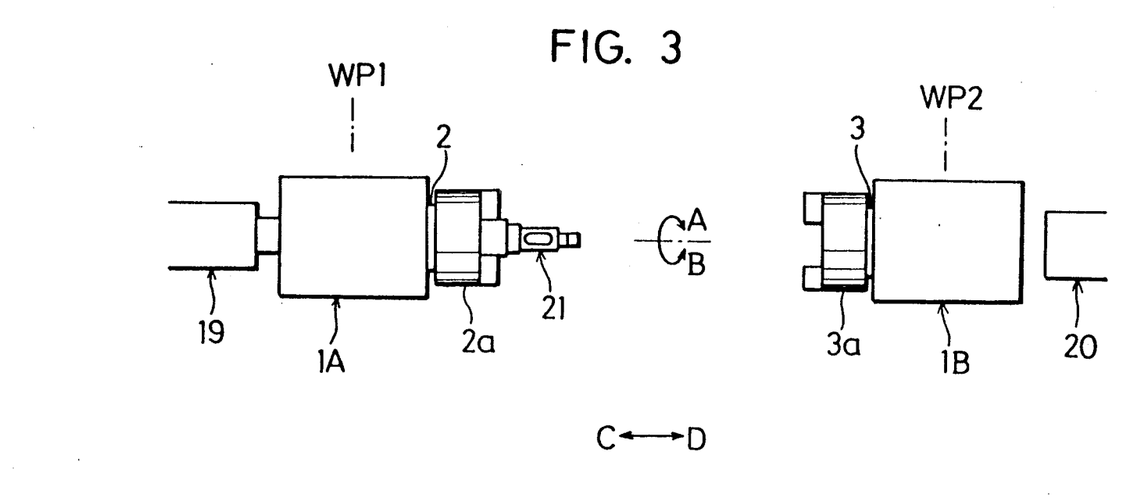
Figure 4:
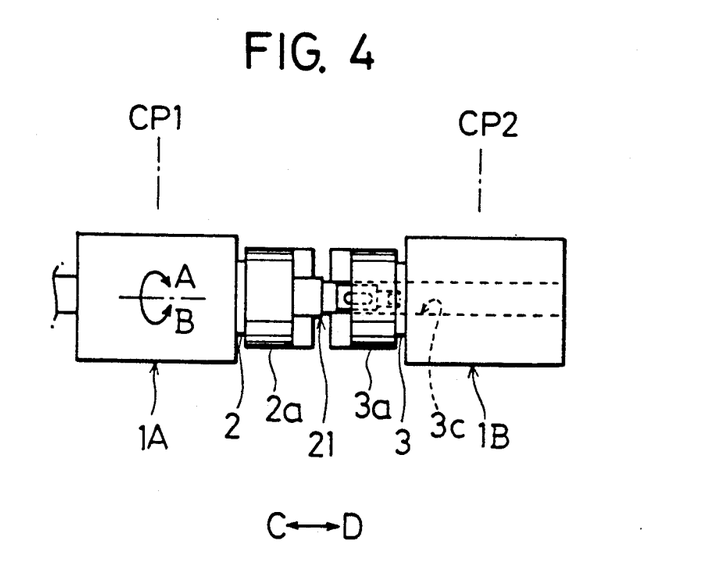

Thereafter, when the program proceeds to step S2 as shown in FIG. 8, the main control portion 9 as shown in FIG. 1 commands the headstock feed control portion 23 as shown in FIG. 1 to position the spindles 2 and 3 at the workpiece delivery positions CP1 and CP2, respectively. Then the headstock feed control portion 23 moves the headstock 1A as shown in FIG. 3 together with the spindle 2 a predetermined distance in the direction as shown by arrow D and moves the headstock 1B together with the spindle a predetermined distance in the direction as shown by the arrow C to position both spindles 2 and 3 at the workpiece delivery positions CP1 and CP2 as shown in FIG. 4. Then the machined portion of the bar-shaped workpiece 21, after the first routine, is inserted in the through hole 3c through the open clamp of the chuck 3a.

Thereafter, in this state, the main control portion 9 as shown in FIG. 1 closes the clamp of the chuck 3a through the chuck clamp opening and closing portion 27 at the third step S3 of the workpiece delivery program CPRO as shown in FIG. 8 and the machined portion of the bar-shaped workpiece 21 after the first routine is held by the chuck 3a. At this point, since the spindles 2 and 3 synchronously rotate in the directions as shown by the arrow A, there is no relative movement between the bar-shaped workpiece 21 held by the spindle 2 with the chuck 2a and the chuck 3a installed in the spindle 3. Accordingly, it is possible that the bar-shaped-workpiece 21 is smoothly clamped and held by the chuck 3a.

And, when the program proceeds to the fourth step S4 of the workpiece delivery program CPRO as shown in FIG. 8, the main control portion 9 as shown in FIG. 1 opens the clamp of the chuck 2a through the chuck clamp opening and closing portion 27 and releases the holding relation between the chuck 2a and the bar-shaped workpiece 21.

Thereafter, when the program proceeds to the fifth step S5 of the workpiece delivery program CPRO as shown in FIG. 8, the main control portion 9 as shown in FIG. 1 commands the headstock feed control portion 23 as shown in FIG. 1 to move the spindle 3 holding the bar-shaped workpiece 21 with the chuck 3a as shown in FIG. 4 a predetermined distance in the direction as shown by the arrow D. Then the headstock feed control portion 23 moves the headstock 1B as shown in FIG. 4 together with the spindle 3 a predetermined distance in the direction as shown by the arrow D with the input/output portion 16. The bar-shaped workpiece 21 held by the spindle 3 through the chuck 3a moves in the direction as shown by the arrow D by being pulled by the headstock 1B, and the raw portion of the bar-shaped workpiece 21 is pulled out of the chuck 2a a predetermined length L2 in the direction as shown by the arrow D in FIG. 5.

Figure 5:
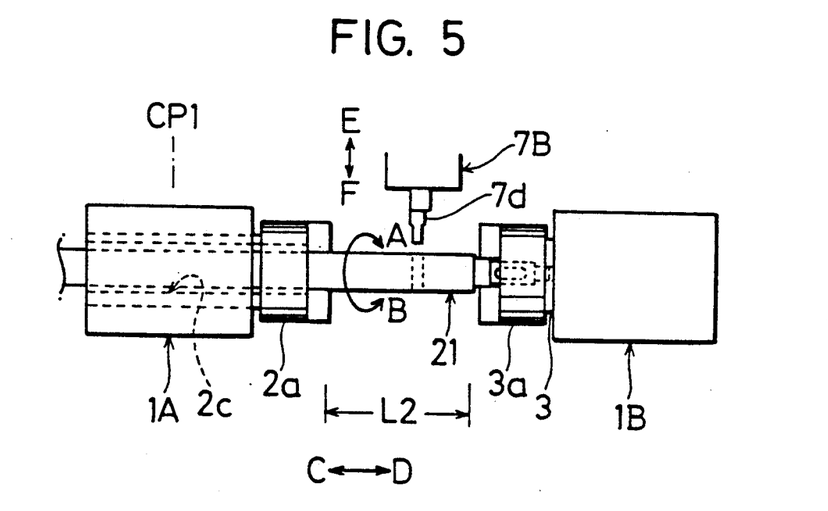

In this state, the main control portion 9 as shown in FIG. 1 closes the clamp of the chuck 2a as shown in FIG. 5 with the chuck clamp opening and closing portion 27 to hold the bar-shaped workpiece 21 with the chucks 2a and 3a on the basis of the workpiece delivery program CPRO as shown in FIG. 8. Thereafter, the main control portion 9 as shown in FIG. 1 drives the tool rest 7B as shown in FIG. 5 through the tool rest control portion 22 to cut the machined portion of the bar-shaped workpiece 21, after the first routine of machining, to which the second routine of machining is to be performed (referred to as part 21a hereinafter) off of the other raw portion by means of the tool 7d for cutting-off installed in the tool rest 7B.

In this way, when the bar-shaped workpiece 21 is cut in two as shown in FIG. 6 and the holding relation between the parts 21a and the spindle 2 is released, the main control portion 9 commands the headstock feed control portion 23 to position the headstock 1B at the second routine machining position WP2 as shown in FIG. 6. Then the headstock feed control portion 23 moves the headstock 1B as shown in FIG. 5 together with the spindle 3 a predetermined distance in the direction as shown by the arrow D to position the headstock 1B at the second routine machining position WP2. The main control portion 9 as shown in FIG. 1 moves the headstock 1A together with the spindle 2 a predetermined distance in the direction as shown by the arrow C with the headstock feed control portion 23 as shown in FIG. 1 on the basis of the workpiece delivery program CPRO to position the headstock 1A at the first routine machining position WP1. In this way, after the spindle 3 is positioned at the second routine machining position WP2 and the spindle 2 is positioned at the first routine machining position WP1, the workpiece delivery finishes.

Thereafter, the second routine of machining is performed on the parts 21a held by the chuck 3a as shown in FIG. 6 by means of the tool 7d installed in the tool rest 7B. In parallel with this, the first routine of machining, the same as the machining as shown in FIG. 2, is performed on the raw portion of the bar-shaped workpiece 21 held by the chuck 2a by means of the tool 7d installed in the tool rest 7A. After the second routine of machining is performed on the parts 21a, the chuck 3a is opened. In this state, the machined part 21a is detached from the spindle 3 through the through hole 3c by driving the workpiece pulling unit 20. In the above-described embodiment, the case where a workpiece such as the bar-shaped workpiece 21 is fed to the spindle 2 by using the barfeeder 19 as a workpiece feed means was discussed. However, any workpiece feed means may be available to be used, if a workpiece can be certainly fed to the spindle 2. For instance, it is permissible that a workpiece such as a shaft-shaped workpiece may be fed to the spindle 2 by using a handling robot as the workpiece fed means. And, it is possible that a worker directly supply the spindle 2 with a workpiece, too.

Figure 7:
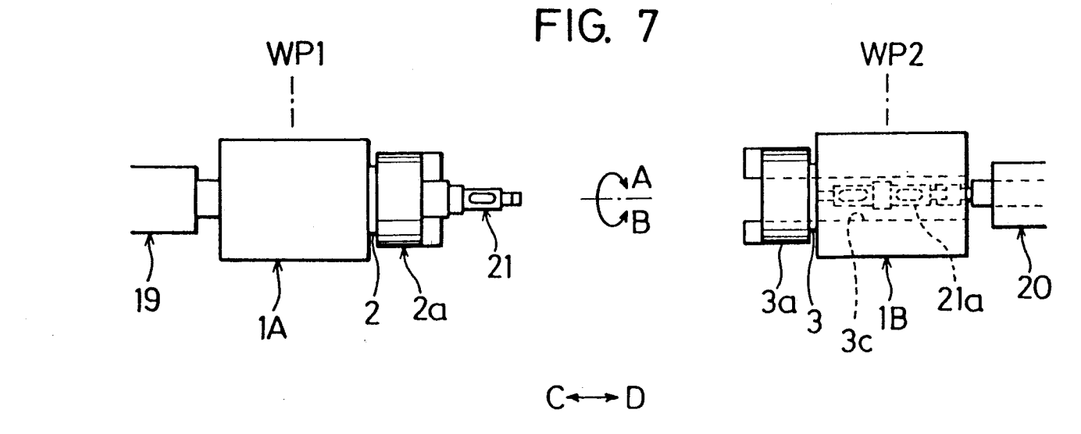

Furthermore, in the present embodiment, the case where a bar-shaped workpiece is used as a workpiece was discussed. In the present invention, a workpiece such as a shaft-shaped workpiece and a chuck workpiece as well as a bar-shaped workpiece are available if the workpiece can be delivered from the first spindle to the second spindle while the spindles are rotating. Moreover, any machining form will do during machining. That is, in cases where a bar-shaped workpiece is not used as a workpiece, the cutting-off movement is unnecessary during machining. In cases where a shaft-shaped workpiece is used, it is possible that, after the raw portion of a workpiece is pulled out from the first spindle (in a state as shown in FIG. 5), machining is immediately performed toward a workpiece held by both spindles. And, a workpiece extruding unit may be provided in order to extrude the machined workpiece after the second routine on the left of the chuck 3a in FIG. 7 through the through hole 3c and expel the workpiece in a parts catcher mounted between the spindles 2 and 3, as well as the workpiece pulling unit 20 provided in order to detach the machined workpiece after the second routine from the second spindle.

Furthermore, as far as the headstocks 1A and 1B are concerned, they can be relatively free to move in the Z axis direction (in the central axis direction of the spindles 2 and 3), and any movement form will do. That is, a structure such as the headstock 1A being fixed and only the headstock 1B moving in the Z axis direction, or the headstock 1B being fixed and only the headstock 1A moving in the Z axis direction, will do.

The present invention has been explained on the basis of the embodiments heretofore. However, the embodiments described on this specification are exemplary, but they are not restricted. The scope of the invention is defined by the attached claims, and are not bound by the description of the embodiments. Accordingly, all deviations and changes covered by the claims are included in the scope of the present invention.

What is claimed is:

1. A machining control apparatus in a machine tool, comprising:

first and second headstocks disposed so as to face each other, said first and second headstocks having first and second workpiece spindles rotatably supported thereby, respectively, at least one of said headstocks being free to move only in the direction of the central axis of said workpiece spindles, said first and second workpiece spindles being connected to respective spindle driving motors, said first and second workpiece spindles having first and second chucks, respectively, and said chucks being openable and closable such that said chucks are able to hold and release a workpiece to be machined;

first and second tool rests corresponding to said first and second headstocks, respectively, said tool rests being free to be moved in at least a direction perpendicular to said direction of said central axis of said first and second workpiece spindles;

said machine tool being capable of performing first and second machining routines on one or more than one workpiece being held by and between said first and second workpiece spindles with said first and second chucks according to a machining program;

a rotational speed digital detection means connected to said first and second workpiece spindles for detecting the rotational speed of said workpiece spindles and outputting the rotational speed of said workpiece spindles as digital signals;

a rotational speed comparison and operation means for comparing said rotational speeds of said workpiece spindles on the basis of said digital signals outputted from said rotational speed digital detection means and outputting an operation signal;

a spindle driving motor control means for controlling said first and second spindle driving motors according to said operation signal from said rotational speed comparison and operation means such that the rotational speeds of said first and second workpiece spindles are equal;

a headstock feed control means for driving and controlling at least one of said first and second headstocks in said direction of said central axis of said workpiece spindles;

a chuck drive and control means for driving and controlling the opening and closing of said first and second chucks;

said first and second workpiece spindles having respective through holes therein such that said through holes penetrate said workpiece spindles in the direction of said central axis; and a workpiece pulling unit disposed on the opposite side of said chuck of at least one of said workpiece spindles such that a machined workpiece held by said workpiece spindle having said workpiece pulling unit is removed passing through the inside of said through hole.

2. The machining control apparatus in a machine tool as set forth in claim 1, and further comprising:

a bar feeder for feeding a bar-shaped workpiece through a said through hole of the other said workpiece spindle other than said workpiece spindle having said workpiece pulling unit.

3. A machining control apparatus in a machine tool, comprising:

first and second headstocks disposed so as to face each other, said first and second headstocks having first and second workpiece spindles rotatably supported thereby, respectively, at least one of said headstocks being free to move only in the direction of the central axis of said workpiece spindles, said first and second workpiece spindles being connected to respective spindle driving motors, said first and second workpiece spindles having first and second chucks, respectively, and said chucks being openable and closable such that said chucks are able to hold and release a workpiece to be machined;

first and second tool rests corresponding to said first and second headstocks, respectively, said tool rests being free to be moved in at least a direction perpendicular to said direction of said central axis of said first and second workpiece spindles;

said machine tool being capable of performing first and second machining routines on one or more than one workpiece being held by and between said first and second workpiece spindles with said first and second chucks according to a machining program;

a rotational speed digital detection means connected to said first and second workpiece spindles for detecting the rotational speed of said workpiece spindles and outputting the rotational speed of said workpiece spindles as digital signals;

a rotational speed comparison and operation means for comparing said rotational speeds of said workpiece spindles on the basis of said digital signals outputted from said rotational speed digital detection means and outputting an operation signal;

a spindle driving motor control means for controlling said first and second spindle driving motors according to said operation signal from said rotational speed comparison and operation means such that the rotational speeds of said first and second workpiece spindles are equal;

a headstock feed control means for driving and controlling at least one of said first and second headstocks in said direction of said central axis of said workpiece spindles;

a chuck drive and control means for driving and controlling the opening and closing of said first and second chucks;

a tool rest cutting-off drive and control means for driving and controlling said first and second tool rests to cut-off a workpiece held between said first and second workpiece spindles;

said first and second workpiece spindles having respective through holes therein such that said through holes penetrate said workpiece spindles in the direction of said central axis; and a workpiece pulling unit disposed on the opposite side of said chuck of at least one of said workpiece spindles such that a machined workpiece held by said workpiece spindle having said workpiece pulling unit is removed passing through the inside of said through hole.

4. The machining control apparatus in a machine tool as set forth in claim 3, and further comprising:

a bar feeder for feeding a bar-shaped workpiece through a said through hole of the other of said workpiece spindle other than said workpiece spindle having said workpiece pulling unit.

* * * * *